Aug. 13, 1968  J. D. BISHOP  3,397,366
INVERTER STARTING CIRCUIT
Filed March 29, 1967
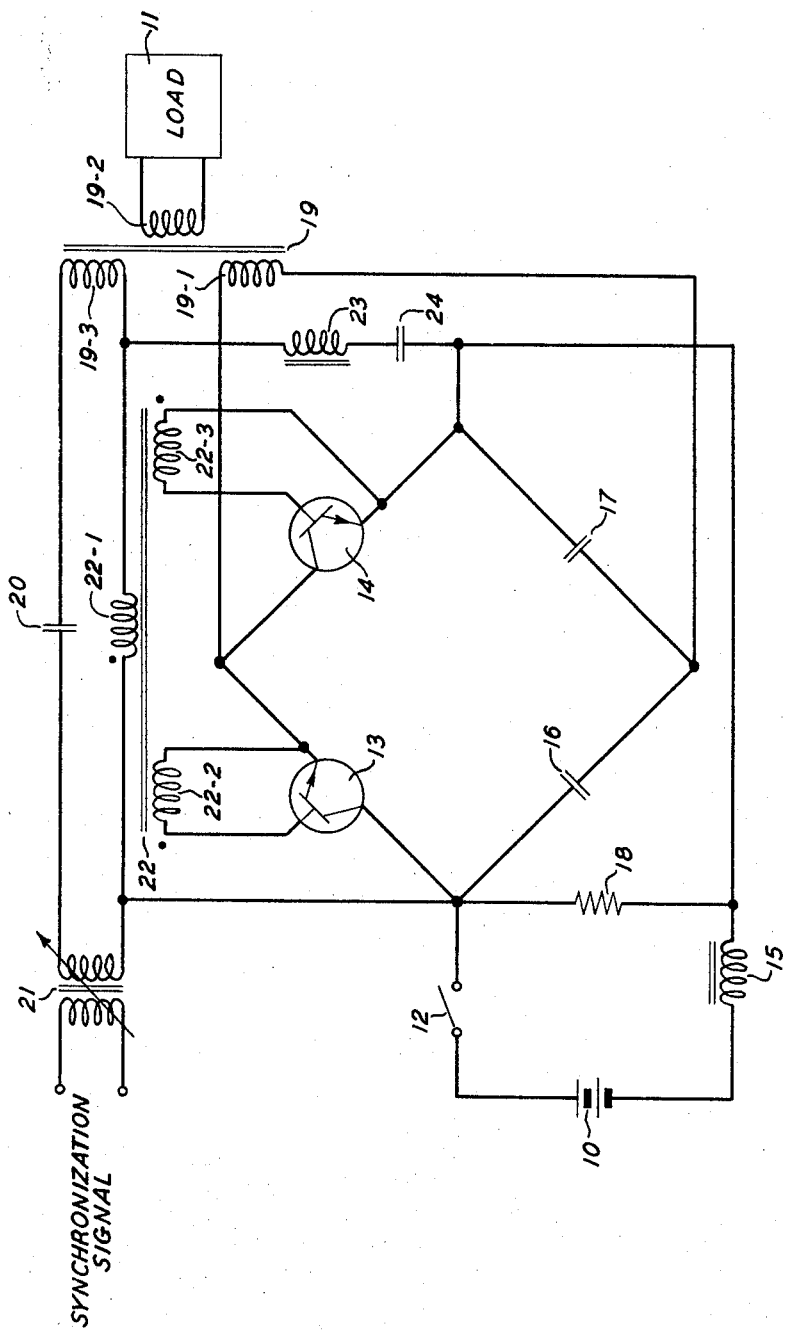
INVENTOR
J. D. BISHOP
BY
R. B. Ardis
ATTORNEY

ભ

3,397,366
INVERTER STARTING CIRCUIT
John D. Bishop, Basking Ridge, N.J., assignor to Bell
 Telephone Laboratories, Incorporated, Berkeley
 Heights, N.J., a corporation of New York
Filed Mar. 29, 1967, Ser. No. 626,728
4 Claims. (Cl. 331—113)

ABSTRACT OF THE DISCLOSURE

In a transistor inverter a series L-C network is connected between the D.C. input source and the primary winding of the emitter-base drive transformer for the switching transistors. When power is applied to the inverter a burst of damped sinusoidal current is generated by means of the L-C network. Either the positive or negative peak of the sinusoidal current overcomes the residual flux of the drive transformer to forward bias one of the switching transistors, thereby assuring the start of switching.

Background of the invention

This invention relates generally to transistor inverters and, more specifically, to transistor inverter starting circuits.

Inverters are generally used in direct current converters to change a direct current input to an alternating current wave which can then be readily transformed to a different voltage level to be rectified and filtered to provide a steady direct current output. In general, it is desirable that the operating frequency of the inverter be as high as possible in order to permit circuit components, especially those of the filter, to be relatively small.

One commonly used inverter makes use of a pair of alternately conducting transistors connected to pass current from the direct current source to the load in respective opposite directions. A positive feedback path is provided from the inverter output to the emitter-base paths of the switching transistors to maintain continuous operation. Either transformer saturation characteristics, separate timing components in the positive feedback path, or a combination of both, control the switching frequency of the transistors and, hence, the frequency of the alternating current output wave.

In such inverters initiation of switching generally requires that at least one of the switching transistors receives a sudden surge of current when the inverter is turned on to render the respective transistor conductive, thereby starting the switching operation.

In order to provide for the necessary surge current in the emitter-base path of one of the switching transistors, it has generally been required that, at the time of power application to the inverter, a condition of circuit unbalance exists to assure that the application of power is operative to render the transistor conductive. Various circuit arrangements have been provided in the prior art for increasing the unbalance condition of the inverter to assure initiation of operation. Resistance-capacitance networks have been connected in the biasing circuit of at least one of such switching transistors, for example, to increase the leakage current unbalance of the circuit, thereby tending to assure conduction of that transistor upon power application to start the switching operation.

These and other starting arrangements which provide either a circuit unbalance or a unidirectional starting surge voltage or current, however, are not sufficient to assure reliable and efficient starting in all inverter applications.

In inverters of the type that require a separate transformer to supply the drive signal for the switching transistors, for instance, the residual flux level of the transformer creates an additional obstacle to proper starting. The effects of such residual flux are particularly detrimental for inverters that are subject to initial heavy load conditions or that have operating frequencies considerably higher than normal inverter operating frequencies as, for example, inverters that have an operating frequency in the region of 20,000 Hz.

The residual flux of such a transformer may be either of positive or negative polarity, depending upon the polarity of the last signal coupled through the transformer before turnoff. In order for the transformer not to be forced into saturation by the starting surge, but to have the transformer couple a sufficient drive signal to the emitter-base path of the switching transistor instead, the starting surge should be of a polarity opposite to that of the residual flux of the transformer.

The primary object of the invention is to provide starting impulses of sufficient amplitude and of the correct polarity to overcome the residual flux of the switching transistor drive transformer.

Another object of the invention is to provide starting impulses sufficient to start switching operations even at high operating frequencies and under initial heavy load conditions.

Summary of the invention

To fulfill these objects, the invention includes in an inverter a series resonant circuit connected between the D.C. source and the feedback path to supply to the switching transistor drive transformer a starting impulse of sufficient amplitude and of the proper polarity to overcome the residual flux in the drive transformer, thereby assuring the start of switching.

More specifically, in one embodiment of the invention a series resonant circuit comprising an inductor and capacitor is connected across the D.C. source in series with the primary winding of the switching transistor drive transformer to supply the required starting impulse, where the series resonant circuit is tuned to a frequency much lower than the steady state operating frequency of the inverter so that the series resonant circuit presents a very high impedance to signals at the operating frequency and is therefore effectively decoupled once switching has started.

Upon application of power to the inverter a transient current is generated in the series network consisting of the source, the primary winding of the drive transformer, and the series resonant circuit which takes the form of a damped sinusoid. That is, the transient current alternates between positive and negative peak values, so that the current of either one or the other peak polarity will be of the proper polarity to overcome the residual flux in the transformer. As a result, one of the peaks of the transient wave is coupled through the transformer to generate a starting surge in the emitter-base paths of the switching transistors. The starting impulse that is coupled into the secondary winding of the transformer contains sufficient energy and is of the proper polarity to forward bias one of the switching transistors to render it conductive, thereby starting the switching operation. Once switching has started it is maintained and has a frequency which is determined by a combination of the feedback arrangement and a tuned circuit.

Brief description of the drawing

The single figure of the drawing is a schematic diagram of a specific embodiment of the invention in an inverter that utilizes a tuned circuit to determine its operating frequency.

Detailed description

In the illustrated inverter, power from direct current source 10 is converted to alternating current to be delivered to load 11. The power is supplied from the positive terminal of source 10 through power switch 12 to the collector electrode of switching transistor 13. The emitter electrode of transistor 13 is in turn connected to the collector electrode of switching transistor 14, and the emitter electrode of transistor 14 is then returned through filter choke 15 to the negative terminal of source 10. Switching transistors 13 and 14 are both n-p-n transistors. The serially connected emitter-collector paths of transistors 13 and 14 are paralleled by the series combination of capacitors 16 and 17, where one terminal of capacitor 16 is connected to the collector electrode of transistor 13 and one terminal of capacitor 17 is connected to the emitter electrode of transistor 14, and where capacitors 16 and 17 have their respective other terminal connected together. The capacitances of capacitors 16 and 17 are chosen to be very large, so that the capacitors present substantially short circuits at the operating frequency of the inverter. A bleeder resistor 18 is connected across the series combination of capacitors 16 and 17 to provide a capacitor discharge path when power is disconnected from the inverter.

The alternating current output power is coupled to load 11 through output transformer 19 which has one terminal of its primary winding 19–1 connected to the junction of capacitors 16 and 17 and the other terminal connected to the junction of the emitter electrode of transistor 13 and the collector electrode of transistor 14. The output power circuit is completed through secondary winding 19–2 which has its terminals connected to load 11.

Positive feedback to maintain the switching is obtained from the inverter output through a feedback winding 19–3 of output transformer 19. The feedback is coupled through winding 19–3 to a tuned circuit comprising in combination the serially connected winding 19–3, capacitor 20, one winding of synchronization coupling transformer 21, and primary winding 22–1 of feedback transformer 22. That is, one terminal of winding 19–3 is connected to one terminal of capacitor 20, the other terminal of capacitor 20 is connected to one terminal of transformer 21, and another terminal of transformer 21 is returned through primary winding 22–1 to the other terminal of winding 19–3.

Synchronization coupling transformer 21 serves one of two distinct purposes. It is used either to couple a synchronization signal from the tuned circuit to other inverters operating in synchronism with the illustrated inverter or it may be used to accept a synchronization signal from external inverters to govern the switching frequency of the illustrated inverter. Transformer 21 also incorporates an adjustable inductance which is variable to tune the tank circuit, thereby controlling the switching frequency of the inverter.

Drive energy for switching transistors 13 and 14 is derived from the tuned circuit through feedback windings 22–2 and 22–3, respectively, of feedback transformer 22. Windings 22–2 and 22–3 have one of their terminals connected to the base electrode and the other terminal connected to the emitter electrode of transistors 13 and 14, respectively.

Starting energy for the inverter is obtained from the source through the series combination of inductor 23 and capacitor 24 which is connected between the junction of windings 22–1 and 19–3 and the junction of choke 15 and resistor 18. To complete the path for the starting energy from the source the other terminal of winding 22–1 is connected to the junction of switch 12 and resistor 18.

Before power is applied to the inverter, capacitors 16, 17, and 24 are discharged through resistor 18 and transistors 13 and 14 are nonconducting. Because of its retentivity characteristics feedback transformer 22 may at this time exhibit a residual flux, where the polarity and magnitude of the residual flux are a function of the instantaneous signal condition in the transformer at the time of the previous inverter turnoff. It may be assumed, for instance, that the residual flux in transformer 22 is of a certain magnitude and of positive polarity. It is then apparent that when the inverter is turned on, a starting impulse that tends to induce a negative polarity pulse must be of sufficient amplitude to overcome the residual flux. This may be accomplished by simply providing for a negative polarity starting impulse of the proper amplitude which is able to couple enough energy into the emitter-base paths of the switching transistors to cause one of these to start conduction.

When the residual flux and the starting impulse are both of positive polarity, however, the positive starting pulse will merely drive the transformer into saturation, thereby preventing the starting impulse from coupling sufficient energy into the emitter-base path of one of the switching transistors. As a result, the transistors are unable to start conduction and the inverter fails to start switching. In order to assure the starting of switching operations it is therefore necessary that the starting impulse which is applied to the feedback transformer have a sufficient amplitude and be of a polarity opposite to that of the residual flux of the transformer to overcome the residual flux and not drive the transformer into saturation.

When power switch 12 is closed to apply power from source 10 to the inverter, capacitors 16 and 17 immediately start to charge to the source voltage through choke 15. At the instant that switch 12 is closed, source 10 is also connected through choke 15 across feedback transformer primary winding 22–1, inductor 23, and capacitor 24. The characteristics of the transient current are primarily determined by inductor 23 and capacitor 24, where the values of inductor 23 and capacitor 24 are chosen to produce a series resonant circuit so that the transient current takes the form of a damped sinusoid. That is, the transient current alternates between positive and negative peak values with successive peaks decreasing in amplitude. One or another of the peaks of the transient current will be sufficient to overcome the residual flux in the feedback transformer, thereby producing sufficient drive energy in the emitter-base path of one of the switching transistors to start the switching operation. The series combination of inductor 23 and capacitor 24 is tuned to a frequency much lower than the steady state operating frequency of the inverter, so that the starting circuit presents a high impedance to the steady state switching frequency and is therefore effectively isolated from the tuned tank circuit once switching has started.

If the residual flux level in the transformer is positive and the transient surge current starts also with a positive peak, the following sequence takes place. Upon closing of switch 12 the transient starting current that is generated in the series resonant circuit of inductor 23 and capacitor 24 is applied to primary winding 22–1. The transient current takes the form of a damped sinusoid, starting from a zero level, reaching first a positive peak, and thereafter alternating between negative and positive peaks, respectively. If the first peak of the starting transient is positive, it produces additional positive flux in the transformer, thereby adding to the positive residual flux to drive the transformer into saturation. As a result, the energy coupled into the secondaries of the feedback transformer is insufficient to cause the transistors to conduct, so that switching operations cannot start.

As soon as the starting transient has passed through its positive peak, it reverses its direction of flow and tends toward its negative peak. During this current reversal, the magnetization of the transformer undergoes a similar change. That is, the transformer is driven out of its positive saturation region through zero magnetization to some negative flux level, the final magnitude of which depends primarily upon the negative peak amplitude of the transient current together with the magnetic characteristics of the transformer.

Regardless of what the final value of the negative peak flux is going to be, it is apparent that a considerable change in flux did take place in transformer 22—namely from positive saturation through zero to some negative flux level. This total change in flux is large enough to couple a sufficient starting impulse into the secondary windings 22–2 and 22–3 to cause one of the transistors to start conduction. That is, primary winding 22–1 is inductively coupled to secondary windings 22–2 and 22–3 with a polarity as indicated by the dots in the drawing. A starting surge current entering winding 22–1 on its dot side, for instance, induces in-phase currents on the dot sides of windings 22–2 and 22–3, respectively. As a result of such a starting surge current through primary winding 22–1 a voltage is induced in winding 22–3 which cuts off transistor 14 and a voltage is induced in winding 22–2 which forward biases the base-emitter junction of transistor 13, causing transistor 13 to conduct.

With transistor 13 conducting as a result of the starting surge current through primary winding 22–1, power from direct current source 10 flows from its positive terminal through switch 12, through the collector-emitter path of transistor 13, winding 19–1, capacitor 17, and through choke 15 back to the negative terminal of source 10. The resulting current pulse through winding 19–1 in addition to being coupled through winding 19–2 to load 11, is also inductively coupled through winding 19–3 into the tank circuit as positive feedback. This positive feedback causes oscillations to start in the tank circuit at a frequency which is primarily determined by the capacitance of capacitor 20 and the inductance of transformer 21. The initial half cycle of oscillation in the tank circuit that is induced as a result of the surge current is of such polarity as to support the condition of transistor 13 through feedback winding 22–2, while cutting off transistor 14 through feedback winding 22–3.

In the next succeeding half cycle the polarity of the oscillations in the tank circuit reverses so that the voltage induced in feedback winding 22–2 cuts off transistor 13, whereas the voltage induced in feedback winding 22–3 forward biases the base-emitter junction of transistor 14, causing it to conduct instead. During the conduction of transistor 14, power is supplied from direct current source 10 through switch 12, capacitor 16, primary winding 19–1, the collector-emitter path of transistor 14, and choke 15 back to the negative terminal of source 10. In alternating half cycles transistors 13 and 14 are therefore rendered alternately conductive, thereby repeating the respective conduction cycles and generating alternating current power for the load.

It is to be understood that the above-described arrangement is illustrative of the application of the principles of the invention. Numerous other arrangements may be devised by those skilled in the art without departing from the spirit and scope of the invention.

What is claimed is:

1. An inverter which comprises a source of direct input current, a pair of switching transistors each having an emitter electrode, a collector electrode, and a base electrode, a pair of capacitors, the emitter-collector paths of said transistors being connected in series to form two adjacent arms of a four-terminal bridge and said capacitors being connected in series to form the remaining two arms of the same bridge, a load connected across a first diagonal of said bridge formed by the juncture between said transistors and the juncture between said capacitors to receive current in one direction from one of said transistors and in the opposite direction from the other of said transistors, said source being connected across the other diagonal of said bridge, feedback means connected to provide regenerative feedback between the emitter-collector path and the emitter-base path of respective transistors to render the emitter-collector paths of said transistors alternately conducting and substantially nonconducting in phase opposition to one another, said feedback means including at least one transformer having a primary winding coupled to the emitter-collector paths of said transistors and one of a plurality of secondary windings connected to each one of a respective emitter-base path of said transistors, and an inductor and a capacitor serially connected between said primary winding and said source to assist in starting switching operations.

2. An inverter in accordance with claim 1 in which said load includes an output transformer having its primary winding connected across the first diagonal of said bridge and having its secondary winding connected to said load, and in which said feedback means includes a tank circuit to determine the switching frequency of said inverter.

3. An inverter in accordance with claim 2 in which said inductor and said capacitor form a series resonant circuit tuned to a frequency substantially smaller than the resonant frequency of said tank circuit to present a high impedance to the resonant frequency of said tank circuit, thereby effectively decoupling said series resonant circuit from said tank circuit once switching has started.

4. An inverter which comprises a source of direct input current, a first and a second transistor each having an emitter electrode, a base electrode and a collector electrode, a first and a second capacitor, the emitter electrode of said first transistor being connected to the collector electrode of said second transistor to form two adjacent arms of a four-terminal bridge and said capacitors being connected in series to form the remaining two arms of the same bridge, a load coupled to a diagonal of said bridge formed by the juncture between said transistors and the juncture between said capacitors, feedback means connected to provide regenerative feedback between the emitter-collector paths and the base-emitter paths of respective transistors to render the emitter-collector paths of said transistors alternately conducting and substantially nonconducting in phase opposition to one another, thereby supplying current to said load in one direction from one of said transistors and in the opposite direction from the other of said transistors, said feedback means including a tank circuit to determine the switching frequency of said inverter and at least one transformer having a primary winding coupled to the emitter-collector paths of said transistors and having one of a plurality of secondary windings connected to each one of a respective base-emitter path of said transistors, and a starting circuit comprising an inductor and a capacitor resonant to a frequency much lower than the switching frequency of said inverter and connected in series between one terminal of said primary winding and one terminal of said source and the other terminal of said primary winding being connected to the other terminal of said source to couple a burst of damped sinusoidal starting current into the primary winding of said feedback transformer upon application of power to said inverter, thereby overcoming the residual flux of said transformer to assure the starting of switching operations.

References Cited

UNITED STATES PATENTS 2,971,126   2/1961   Schultz _____ 331—113

JOHN KOMINSKI, *Primary Examiner.*